United States Patent [19]

Fischbach

[11] 3,956,792
[45] May 18, 1976

[54] HANDLE FOR POTS AND RECEPTACLES

[75] Inventor: Wolfgang Fischbach, Daaden, Sieg, Germany

[73] Assignee: Heinrich Baumgarten, Eisen- und Biechwarenfabrik, Neunkirchen, Kreis Siegen, Germany

[22] Filed: Nov. 13, 1974

[21] Appl. No.: 523,605

[30] Foreign Application Priority Data
Nov. 17, 1973 Germany.............................. 2357431

[52] U.S. Cl.............................................. 16/114 A
[51] Int. Cl.² ........................................ A47B 95/02
[58] Field of Search .......... 16/110 R, 110 A, 114 R, 16/114 A; 220/94 R, 96

[56] References Cited
UNITED STATES PATENTS

| | | | |
|---|---|---|---|
| 1,131,863 | 3/1915 | Phillips.............................. | 16/114 R |
| 1,719,461 | 7/1929 | Bolton............................... | 16/114 R |
| 1,815,165 | 7/1931 | Scofield ............................ | 16/114 R |
| 2,191,294 | 2/1940 | Turner............................... | 16/114 R |
| 3,263,267 | 8/1966 | Ahlberg ............................ | 16/114 R |
| 3,426,385 | 2/1969 | Gutshall............................ | 16/114 R |

FOREIGN PATENTS OR APPLICATIONS

| | | | |
|---|---|---|---|
| 2,019,571 | 11/1971 | Germany .......................... | 16/110 A |

Primary Examiner—George H. Krizmanich
Attorney, Agent, or Firm—Woodhams, Blanchard and Flynn

[57] ABSTRACT

A handle for a container releasably secured to a connecting member fixed to the wall of a container, which connecting member has a supporting arm extending outwardly therefrom with a spring engaging member thereon spaced outwardly from the wall of the container. A handle having a cavity therein is provided and the connecting member is received into the cavity. The cavity has at least one groove therein extending radially of the wall of the container and is in vertical alignment with the spring engaging member. At least one two-arm spring having generally a V-shape is provided with the arms of the spring being received in the groove provided in the cavity. The apex of the V-shaped spring is spaced from the bottom of the groove a distance greater than the spacing between the bottom of the groove and the spring engaging member. One arm of the spring is engaged by the spring engaging member to urge the arms into the groove and the interior surface of the cavity into engagement with the supporting arm. The apex of the spring is located between the spring engaging member and the wall of the container for holding the handle into engagement with the connecting member.

7 Claims, 10 Drawing Figures

U.S. Patent  May 18, 1976  3,956,792
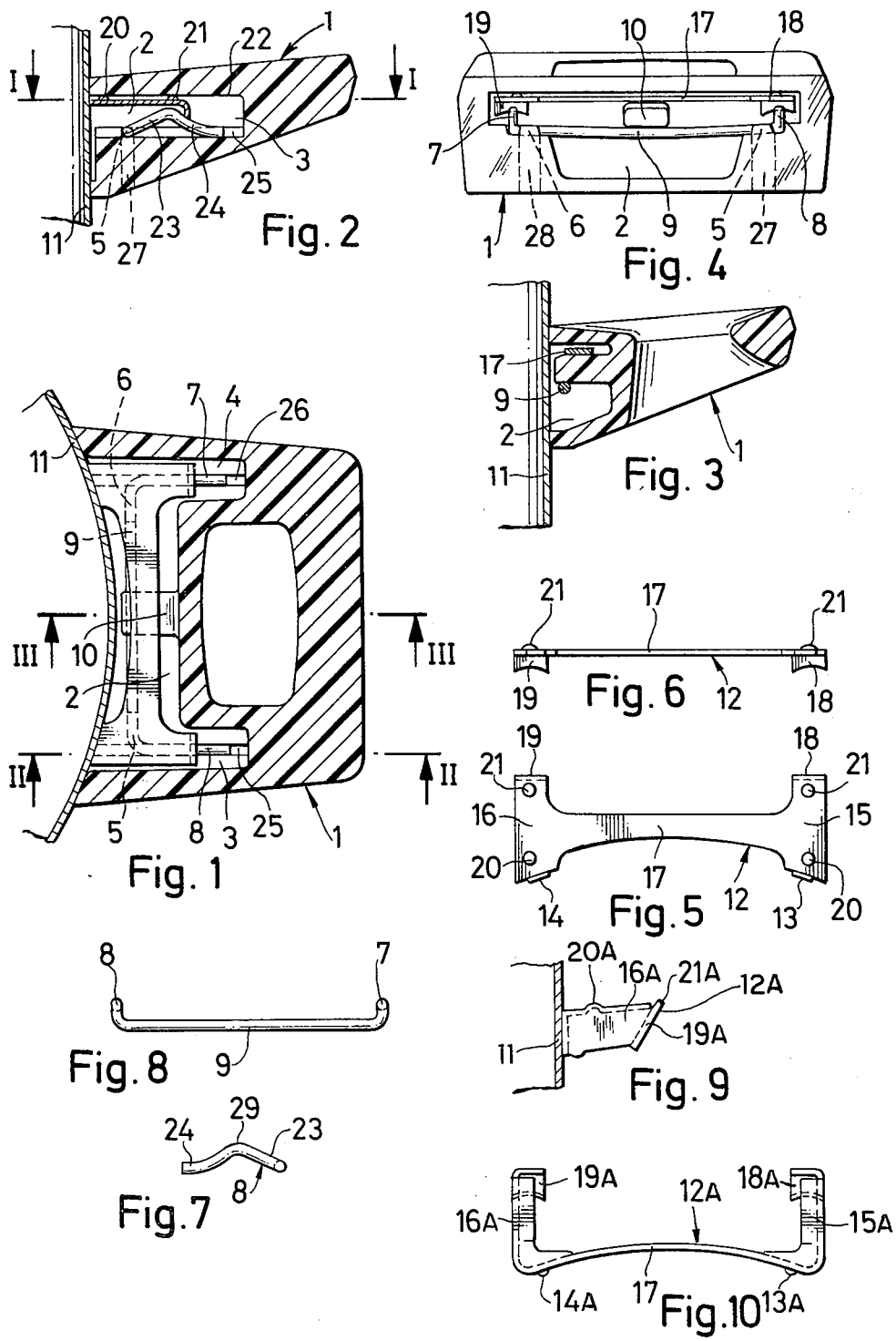

3,956,792

HANDLE FOR POTS AND RECEPTACLES

FIELD OF THE INVENTION

This invention relates to a handle comprising a supporting arm adapted to be joined to a pot or other container, a handle body having a cavity to receive the supporting arm, said cavity being adapted to receive means for fastening the handle body to the supporting arm, said means comprising at least one spring which is located by recesses in the handle body and is stressed and locked when the handle body is pushed onto the supporting arm, whereby the handle body is secured to the supporting arm and is pressed against the container.

BACKGROUND OF THE INVENTION

In one known handle of the kind described above two springs which are bent in U-shape, and the limbs of which are directed parallel to the shorter side of the handle body, that is to say perpendicularly to the latter, serve to secure the handle body on the supporting arm. Webs connecting the limbs of the springs lie in grooves in the handle. With this arrangement of the spring considerable spring forces are achieved, but the spring deflections are limited. The consequence is that the tolerances occurring when the spring arms are welded in position may lead to the slackening of the spring, and the handle becomes loose.

It is an object of the invention to provide a handle of the kind first described above which enables the spring deflections to be lengthened, so that the tolerances occurring when the supporting arm is welded in position have only little effect on the spring tension.

According to the invention there is provided a handle body having a cavity to receive the supporting arm, said cavity being adapted to receive means for fastening the handle body to the supporting arm, said means comprising at least one spring which is located by recesses in the handle body and is stressed and locked when the handle body is pushed onto the supporting arm, whereby the handle body is secured to the supporting arm and is pressed against the container, wherein the supporting arm is adapted to lie against a side of the cavity and is provided with bent-over portions, and wherein the handle body is fastened to the supporting arm by two V-shaped springs disposed in the recesses formed in a wall of the cavity, said springs each comprising a lead-in arm and a retaining arm and at the ends thereof nearest the open end of the cavity being located in recesses provided in the handle body and having the opposite ends thereof supported against a side of the cavity and their retaining arms bearing against the bent-over portions of the supporting arm.

In order to prevent lateral displacement, the springs themselves are guided in a longitudinal groove disposed to the handle body. Furthermore, in a preferred embodiment the end faces of the bent-over end of the supporting web are made concave. Lateral guidance of the springs is thereby likewise obtained.

In another embodiment of the invention the two springs are connected together by a connecting member. The connecting member is supported against a projection of the handle body and is thereby lightly stressed. The advantage of this arrangement consists in that this prestressing ensures reliable holding of the springs in the handle body both for transport and for assembly.

BRIEF DESCRIPTION OF THE DRAWINGS

The invention will now be described, by way of example, with reference to the accompanying drawings, in which:

FIG. 1 is a section through a handle taken along the line I—I in FIG. 2;

FIG. 2 is a section taken along line II—II in FIG. 1;

FIG. 3 is a section taken along the line III—III in FIG. 1;

FIG. 4 is an end view of a handle of the kind shown in FIG. 1;

FIG. 5 is a plan view of a handle body supporting arm;

FIG. 6 is an end view of the supporting arm shown in FIG. 5;

FIG. 7 is a side view of a spring for fastening the handle;

FIG. 8 is an end view of FIG. 7;

FIG. 9 is a section through another form of construction of a supporting arm according to the invention, and FIG. 10 is a plan view of the supporting arm shown in FIG. 9.

DETAILED DESCRIPTION

Referring to the drawings, FIG. 1 shows a handle body 1 which is made of plastics material and is provided with a cavity 2 which includes pockets 3, 4 to receive the fastening means for the handle body 1. On each side of the cavity 2, in the region of the pockets 3 and 4, and recesses 5, 6 are formed in the handle body 1. The recesses 5, 6 serve to receive the bent-over ends of respective springs 7 and 8 which are connected one with the other by a connecting member 9.

In the center of the cavity 2 there is formed on the handle body 1 a projection 10 against which the connecting member 9 for the two springs 7, 8 bears. Slight stressing of the springs 7, 8 is thereby achieved, so that they are secured against falling out of the handle body 1. The assembly of the handle is thereby substantially facilitated.

FIG. 1 shows a handle body 1 fastened on a container wall 11. The handle 1 is fastened on the container wall 11 with the aid of the supporting arm 12 which is welded to the container wall and with the aid of the previously mentioned springs 7 and 8. The supporting arm 12 shown in FIGS. 5 and 6 has two spot welds 13, 14 fastening it to the container wall. The supporting arm 12, FIG. 5, is of H-shape and, as described above has a central portion 17 and two arms 15, 16 the ends of which are provided wth bentover portions 18, 19 having concave end faces. The upper sides of the arms 15 and 16 are each provided with a protrusion 20, 21 intended to ensure exact engagement of the supporting arm 12 with the wall 22 of the cavity 2 and pockets 3, 4.

FIGS. 9 and 10 show another form of connecting member. In the drawings like parts are indicated by like reference numbers but with a suffix "A" added thereto. The connecting member has a supporting arm 12A which is fastened to a container wall 11 by means of spot welds 13A and 14A. The supporting arm 12A has arms 15A, 16A extending from the ends thereof and the central part 17A of the arm 12A lies directly against the wall of the pot. The two arms 15A and 16A have at their free ends bent-over portions 18A, 19A which in contrast to bent-over portions shown in FIGS.

5 and 6, are bent over inwards and not downwards. The bottom end faces of the bent-over portions 18A, 19A are made concave in order to provide guides for the springs 7 and 8.

The upper surface of each arm 15A and 16A is provided with a protrusion 20A, 21A which protrusions are intended to ensure exact engagement of the supporting arm 12A with a wall 22 of the cavity 2 and pockets 3, 4. The connecting member shown in FIGS. 9 and 10 can be produced in a very economical manner.

The two springs 7, 8 are each of generally V-shape and comprise limbs 23 and 24 of which the arms 23 act as lead-in guides for the bent-over portions 18, 19 of the supporting arm when the handle body is fitted thereto and the arms 24 co-act with the portions 18, 19 to retain the handle body in position on the container. The connecting member 9 connecting the two springs 7, 8 is held in the recesses 5, 6 and makes it impossible for the springs 7, 8 disposed in the pockets 3, 4 to be displaced in the axial direction. Longitudinal grooves 25, 26 extend from the bottoms of the pockets 3, 4 along the bottom of the cavity 2 and form guides for the springs 7 and 8. It is thereby made impossible for the springs to be laterally displaced and thus to slacken.

When the handle body 1 is pushed onto the supporting arm 12 the lead-in arms 23 of th springs 7 and 8 first come into contact with the bent-over portions 18, 19 of the supporting arm. The springs, whose apices initially bear against the top of the cavity 2 and against a side of the pockets 3, 4 respectively, are thereby compressed and stressed until the apices of the springs 7, 8 have passed under the bent-over portions 18, 19 of the supporting arm 12. When the retaining limbs 24 of the springs lie against the bent-over portions 18, 19 the spring can easily be slackened again. The distance between the bent-over portions 18, 19 and the wall 11 of the container and the size of the springs and their arrangement in the handle body are so selected that the handle body 1 bears against the wall 11 of the container before the springs 7, 8 have been substantially slackened. Since the retaining limbs 24 of the springs have only a relatively slight inclination variations in the distance between the bent-over portions 18, 19 and the wall 11 of the container lead to only slight variations of the spring tension. The forces applied by the springs to the handle body press the latter against the wall 11 of the container, so that the handle is seated without clearance against the container.

As shown in FIGS. 2 and 4, the recesses 5, 6 are accessible through apertures 27, 28. In order to detach the handle body 1 from the container, all that is required is to insert a tool through the apertures 27, 28 and to force the springs out of the recesses 5, 6. The springs are thereby slackened and the handle can easily be drawn off from the handle supporting arm 12.

The embodiments of the invention in which an exclusive property or privilege is claimed are defined as follows:

1. A handle for a container, comprising:
   a connecting member secured to a wall of said container and having a supporting arm extending outwardly therefrom;
   spring engaging means on said supporting arm spaced outwardly from said wall of said container;
   a handle having a body with a cavity therein receiving said supporting arm and said spring engaging means therein, said cavity having at least one groove in the wall thereof extending radially of said wall of said container, said groove being in vertical alignment with said spring engaging means and spaced therefrom;
   at least one two-arm spring having generally a V shape, said arms of said spring being received in said groove in said cavity, the sidewalls of said groove preventing lateral movement of said spring relative to said handle, the apex of said V-shaped spring between said two arms being spaced from the bottom of said groove a distance greater than the spacing between said bottom of said groove and said spring engaging means when said handle is mounted on said connecting member, an inclined arm of said spring between said bottom of said groove and said apex being engaged by said spring engaging means to urge said arms remote from said apex into said groove and an interior surface of said cavity into engagement with said supporting arm and said apex being located between said spring engaging means and said wall of said container for holding said handle into engagement with said connecting member.

2. A handle according to claim 1, wherein said cavity has two spaced and parallel grooves therein;
   wherein two two-arm springs are provided, both having generally a V shape, the arms of each of said springs being received in one of said grooves;
   wherein the apices of both springs are spaced from the bottom of the respective one of said grooves a distance greater than the spacing between said bottom of said groove and said spring engaging means; and
   wherein said spring engaging means engages both of said springs adjacent the apices thereof with each apex being located between said spring engaging means and said wall of said container for holding said handle into engagement with said connecting member.

3. A handle according to claim 2, wherein said grooves extend longitudinally of the cavity parallel to the longitudinal axis of said cavity.

4. A handle according to claim 2, wherein the corresponding ends of said springs located in said recesses are connected by a connection member.

5. A handle according to claim 2, wherein said grooves and one of said arms of each of said springs are accessible through apertures extending through said handle body into said grooves.

6. A handle according to claim 2, wherein said spring engaging means is of concave configuration.

7. A handle according to claim 5, wherein without being damaged, said handle body can be removed from said supporting arm through the use of a tool insertable into said apertures to displace said arms of said springs from said grooves.

* * * * *

UNITED STATES PATENT OFFICE
CERTIFICATE OF CORRECTION

Patent No. 3,956,792     Dated May 18, 1976

Inventor(s) Wolfgang Fischbach

It is certified that error appears in the above-identified patent and that said Letters Patent are hereby corrected as shown below:

In the name of the Assignee; please change "Biechwarenfabrik" to ---Blechwarenfabrik---.

Signed and Sealed this

Fourteenth Day of September 1976

[SEAL]

Attest:

RUTH C. MASON
Attesting Officer

C. MARSHALL DANN
Commissioner of Patents and Trademarks